United States Patent [19]

Vandenberg et al.

[11] 4,150,638
[45] Apr. 24, 1979

[54] LOCKING STANCHIONS FOR CATTLE

[76] Inventors: Ben W. Vandenberg, 17226 Roseton Ave.; August Vandenberg, 17306 Roseton Ave., both of Artesia, Calif. 90701; Andrew W. Vandenberg, 15751 Ryon St., Bellflower, Calif. 90706

[21] Appl. No.: 779,169

[22] Filed: Mar. 18, 1977

[51] Int. Cl.² .............................................. A01K 1/00
[52] U.S. Cl. .................................................. 119/148
[58] Field of Search ........................................ 119/148

[56] References Cited

U.S. PATENT DOCUMENTS

| | | | |
|---|---|---|---|
| 1,081,045 | 12/1913 | James | 119/148 |
| 1,465,126 | 8/1923 | Goodridge | 119/149 |
| 4,051,813 | 10/1977 | Albers | 119/148 |

*Primary Examiner*—Louis G. Mancene
*Assistant Examiner*—Daniel J. Leach
*Attorney, Agent, or Firm*—Mahoney, Schick & Cislo

[57] ABSTRACT

In stanchions of the type used for milking and/or feeding but primarily the feeding of cattle, a stanchion structure having vertically spaced upper and lower horizontal members with swing pipes defining spaced positions for accommodating cattle in spaced, captive relationship and having intermediate vertical support posts, an improved structure is provided employing an extending draw bar having spaced notches or slots wherein a locking member is pivotally secured to each of the swing pipes so that the individual swing pipes may be selectively opened or closed either individually or in unison to permit free access or egress from the spaced, cattle positions by the cattle and wherein the locking mechanisms are protected by the swing pipe structure so as to inhibit opening of the locking mechanism by cattle. The invention is also directed to a conversion kit for existing stanchion structures to provide for the locking feature in a simple and economically feasible manner.

12 Claims, 7 Drawing Figures

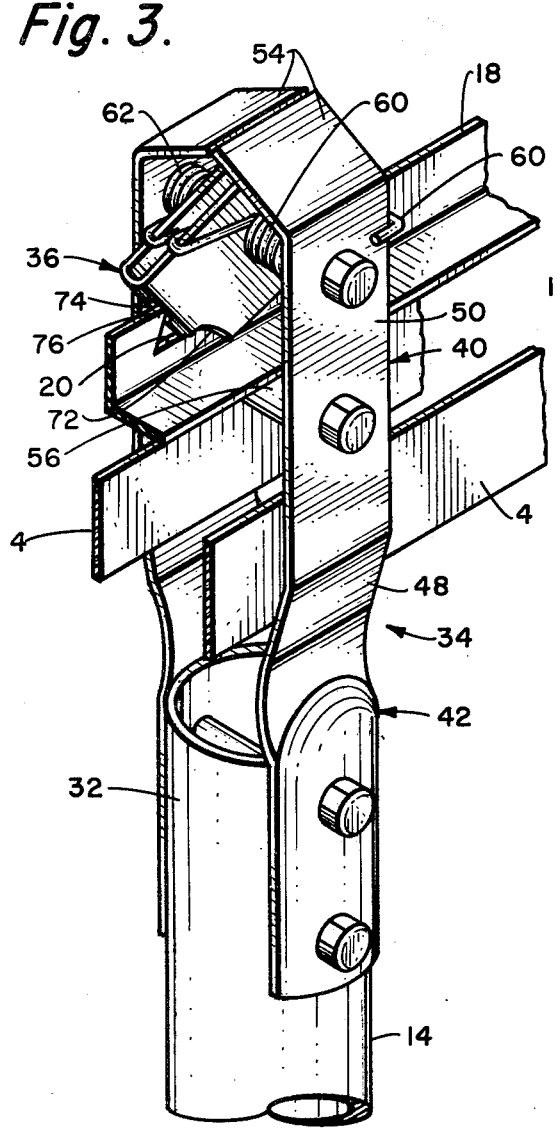
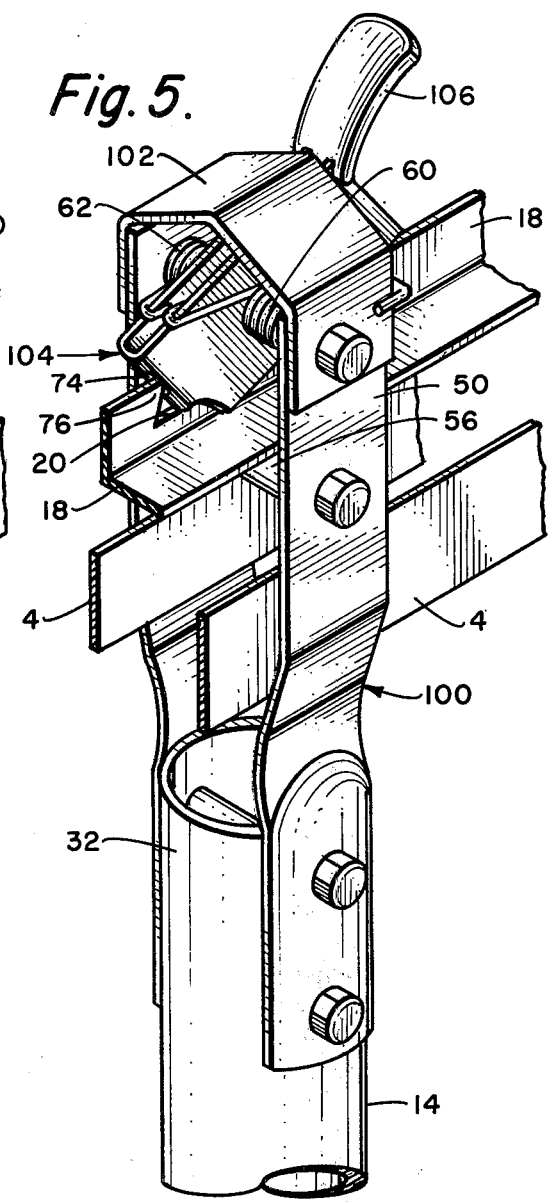
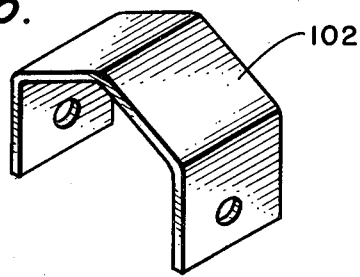
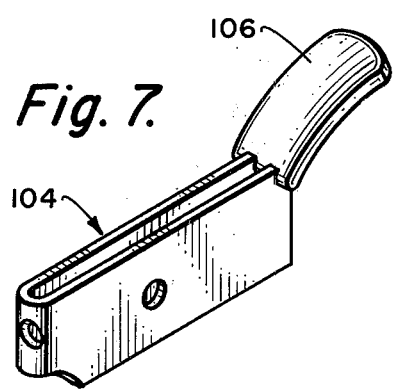

LOCKING STANCHIONS FOR CATTLE

BACKGROUND OF THE INVENTION

In the cattle industry occasions arise wherein it is necessary and desirable to provide spaced positions, stalls or stations to be occupied by cattle wherein the cattle are retained in those positions in a captive manner. The most prominently occasioned instance, wherein cattle are retained in spaced stations, is wherein cattle are fed on an intermittent basis and it is desired to feed each individual animal a metered or allocated amount. To ensure that each individual animal obtains its fair share and no more or no less than other of the animals, some of which may exhibit aggressive tendencies in feeding, it becomes necessary to provide stanchions in order to captively retain each individual animal in a selected position during feeding or other process which is to be individually accomplished on each of the animals.

The most common means of ensuring appropriate feeding of cattle is by the utilization of stanchion devices wherein the stanchions provide individual places or positions which are occupied by an individual animal and wherein the individual animal is locked in that position or retained in a captive relationship with regard to the stanchion. The stanchions ordinarily employ upper and lower horizontal members having spaced swing bars affixed therebetween with adequate support posts to support the stanchions and wherein the swing bars when in the open position, define spaced openings or positions into which an individual animal may enter for feeding and/or other purposes. Once the swing bar is moved to the closed position, the individual animal's head is retained captively within the stanchion structure and cannot remove its head prior to the stanchions or more specifically the individual swing bars being opened. Some animals are skittish or fearful of being approached by human beings and thus, once they have entered and occupied a spaced position, the swing bar may not be able to be closed without frightening the animal which would withdraw from the occupied position and not be captively retained therein. In other instances, in order to conserve on the amount of human labor, it is desirable to be able to open and close a plurality of swing bars at one time by a single actuator member to accomplish this purpose from a point removed from and central to the plurality of stanchions involved.

Various self-locking stanchions have been proposed utilizing single actuator members whereby the swing bars may be opened and/or closed in unison but for the most part, such stanchion structures have been either complicated, expensive to build and install, or have been deficient in the respect that individual cattle retained in the individual stanchions were able to open the individual locking mechanisms, thereby defeating the intent and purpose of such stanchion structures. With the herein disclosed invention, a locking stanchion is provided which is incapable, for all intents and purposes, of being opened by cattle, whether intentionally or inadvertently, and wherein an existing stanchion structure may be easily modified to provide a stanchion construction having the attributes of the herein disclosed invention. Additionally, the stanchion structure of this invention provides simple, straightforward means of assuring selective, captive retention of cattle in a stanchion structure for feeding or other purposes and wherein the individual swing bars making up the stanchion structure may be individually operated or operated in unison to be moved into the open or the closed position.

OBJECTS AND SUMMARY OF THE INVENTION

It is an object of the invention to provide a multiple stanchion construction for selectively and captively retaining cattle at feeding stations and the like.

It is another object of the invention to provide a stanchion construction wherein the swing bar is movable into the closed and locked position and which is not easily opened by cattle.

It is another important object of the invention to provide a stanchion construction which is easily modified to utilize locking members to captively and selectively retain cattle which is not easily, inadvertently or unintentionally releasable to permit egress by cattle.

It is still another more important object of the invention to provide a multiple stanchion construction employing a plurality of swing bars for captively retaining cattle in spaced relationship wherein the swing bars are locked in position and may be actuated to act in unison or may be individually actuatable to retain or release cattle at one or more of the spaced positions.

It is still another even more specific and important object of the invention to provide a stanchion construction utilizing a swing bar wherein a locking member is retained on the terminus of the swing bar in a manner so that the locking member is at least partially shielded so as to inhibit and prohibit opening of the locking member by cattle.

It is an even further still more important specific object of the invention to provide a stanchion construction which is adaptable to existing stanchion constructions in order to make the swing bars thereof locking and non-releasable so as to captively and selectively retain cattle within the station defined by the stanchion construction.

It is an even further, still more specific object of the invention to provide a locking member for a stanchion structure employing a draw bar wherein the draw bar has spaced slots or notches and wherein a locking member is normally urged into contact with such draw bar and/or slot in order to effectively retain in secured and locked relationship a swing bar making up the stanchion construction.

In an exemplary embodiment, the invention is directed to a multiple stanchion construction having vertically spaced upper and lower horizontal support members, intermediate vertical support posts and spaced swing pipes defining spaced positions for accomodating cattle in spaced, captive relationship. A draw bar extending the length of and cooperatively supported relative to said upper horizontal support member and from each of the said spaced swing pipes, is provided. A plurality of spaced locking slots is provided in said draw bar adjacent each of said swing pipes and a locking member is pivotally supported from the upper terminii of each of said swing pipes and being normally urged into engagement with said draw bar and said spaced slots. The swing pipes and cooperating locking members are selectively positionable in a locked and unlocked position with each of said terminii of said swing pipes having a structural configuration to at least partially overlie each of said locking members. Actuator means is provided for horizontal movement of said draw bar to simultaneously move each of said swing bars having its associated locking member in the engaged position with said adjacently positioned slot of said draw bar for movement into the locked and unlocked positions.

These and further objects of the invention will become apparent from the hereinafter following commentary taken in conjunction with the drawings.

BRIEF DESCRIPTION OF THE DRAWINGS

FIG. 3 is a fragmentary view of one embodiment of the invention, illustrating a terminus of a swing bar;

FIG. 5 is a view similar to FIG. 3 but illustrating still another embodiment of the invention;

FIG. 6 is a perspective view of one of the elements of the invention as illustrated in FIG. 5; and FIG. 7 illustrates alternative locking member having an extending tab or actuator portion as illustrated in FIG. 5.

DESCRIPTION OF THE BEST EMBODIMENTS CONTEMPLATED

Figure 1:
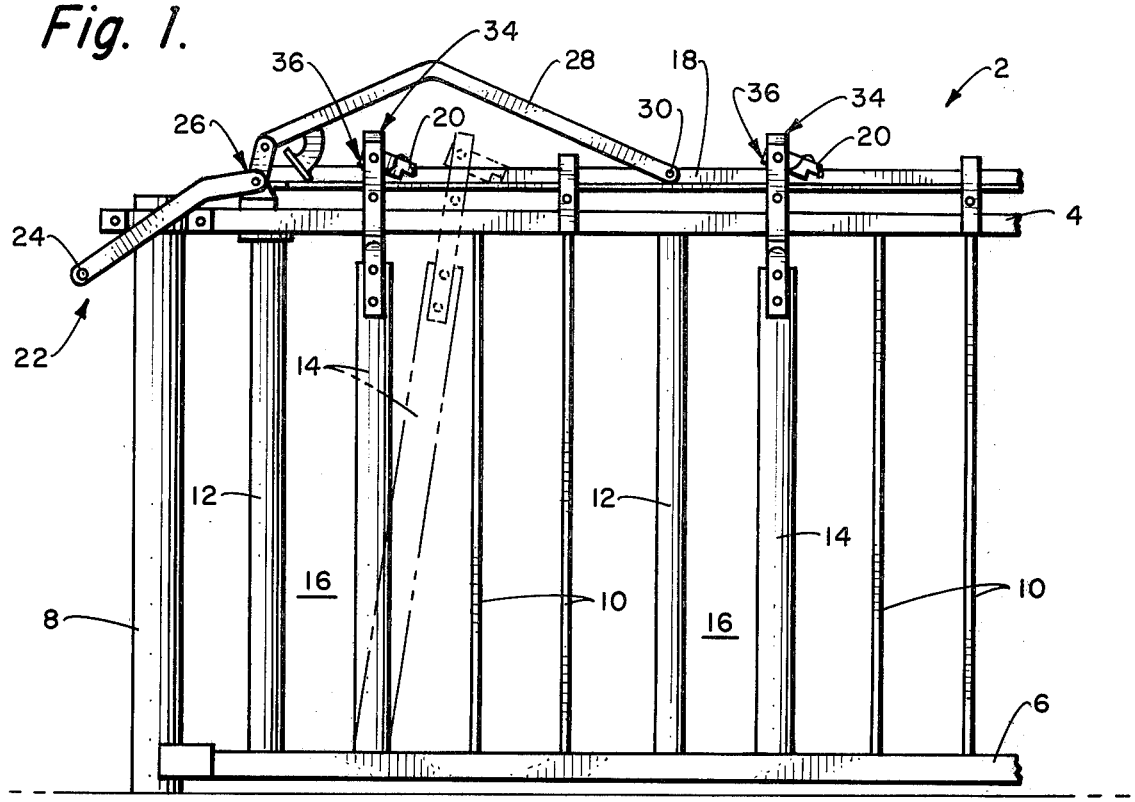
FIG. 1 is a fragmentary view of one of the embodiments of the invention, the phantom lines showing the swing bar in the open or cattle receiving position.

Referring to the drawings wherein like numerals of reference designate like elements throughout, and referring specifically to FIG. 1, the stanchion construction 2 of the invention is illustrated in somewhat diagrammatic form, it being understood that while only two cattle receiving stations are illustrated, that there is contemplated a plurality of such stations and that the invention as described will be applicable to such additional stations in that the structures specifically shown and described may be modified accordingly. In the stanchion structure 2 as illustrated, it will be noted that a conventional stanchion structure employing spaced upper horizontal member 4 and lower horizontal member 6 conventionally supported, for example, from vertical support member 8 embedded in concrete or the like, and having spaced vertical reinforcing members 10 and rigidly secured vertical posts 12 with adjacently positioned swing bars 14, defining therebetween spaced cattle receiving stations 16, is illustrated.

Figure 2:
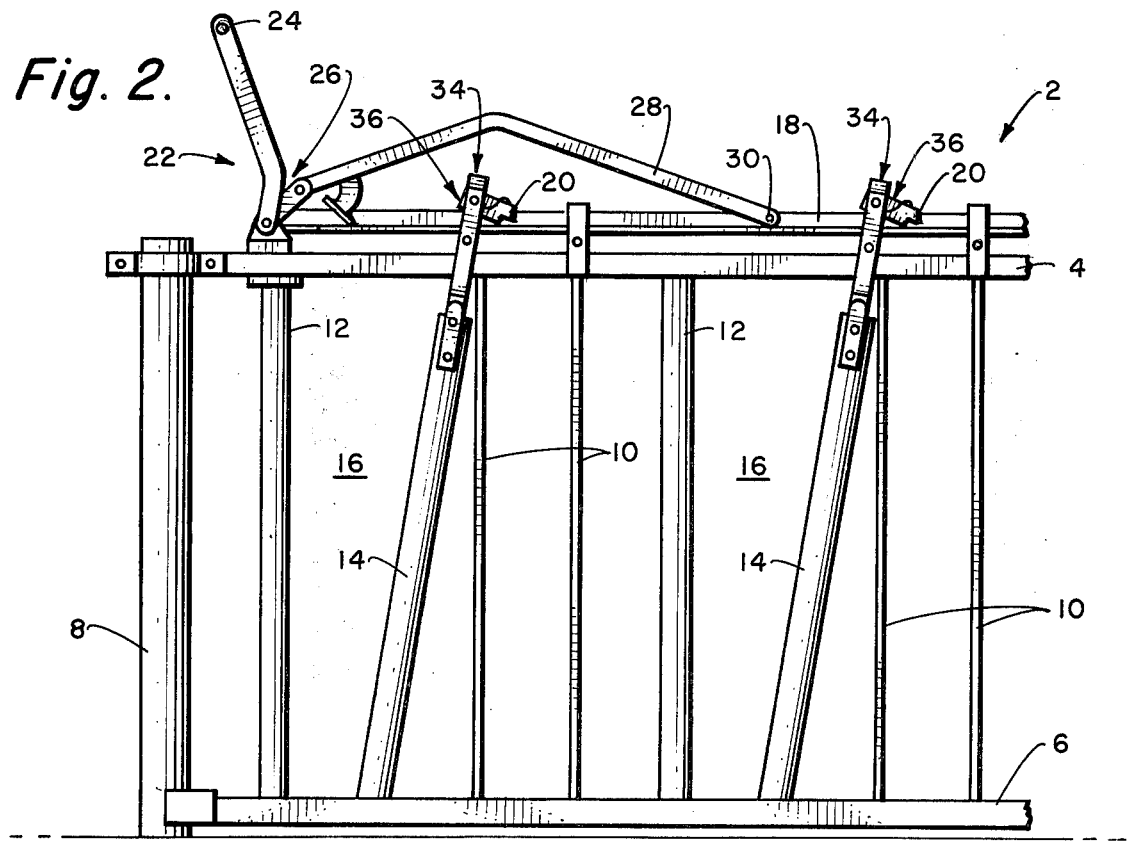
FIG. 2 is a view similar to FIG. 1 but illustrating the swing bars in the open cattle receiving position and illustrating the actuator for simultaneous operation.

Swing bar members 14 are pivotally mounted so as to pivot about their lower ends secured to lower horizontal member 6 and movable between the open or cattle receiving position as illustrated in FIG. 2, to the closed or locked position, as shown in FIG. 1. The stanchions as shown in FIGS. 1 and 2 are positioned such that one would be looking at the heads of the cattle within the stations 16. Swing bars 14 are illustrated as being tubular in configuration but obviously other shapes may be utilized and while the upper horizontal member 4 is shown as rectangular in shape, in actual practice and in most instances, this member will be tubular or pipe shaped.

Extending through the station positions 16 is elongate draw bar 18, V-shaped in configuration with integral vertical and horizontal flanges, having spaced notches 20 corresponding in number to the number of swing bars 14 defining the number of cattle receiving stations 16. At one end or the other is provided an actuator means 22 comprising offset handle 24 connected through linkage 26 to operating lever 28 secured to draw bar 18 as at 30 so as to linearly move draw bar 18 between a first and second position, which correlates to the open and closed position of swing bars 14 as illustrated in FIGS. 1 and 2.

That is, the terminus 32 of each swing bar 14 is provided with lock box mechanisms generally designated 34 employing a locking member generally designated 36 which coacts with the individual spaced slots or notches 20 to thereby lock swing bar 14 to cooperatively move with the movement of draw bar 18. Thus, once engaged, the individual locking members 36 cause the individual swing bars 14 to move in unison or in cooperation with the movement of draw bar 18 and thus, all such swing bars having the locking members 36 engaged with the respective adjacently positioned slots or notches 20 will move when the draw bar 18 is moved by means of actuator 22. Thus, all of the swing bars upon movement of the draw bar by means of actuator 22 will move in unison to either the open cattle receiving position as illustrated in FIG. 2, or into the locked cattle retaining position as shown in FIG. 1.

Figure 4:
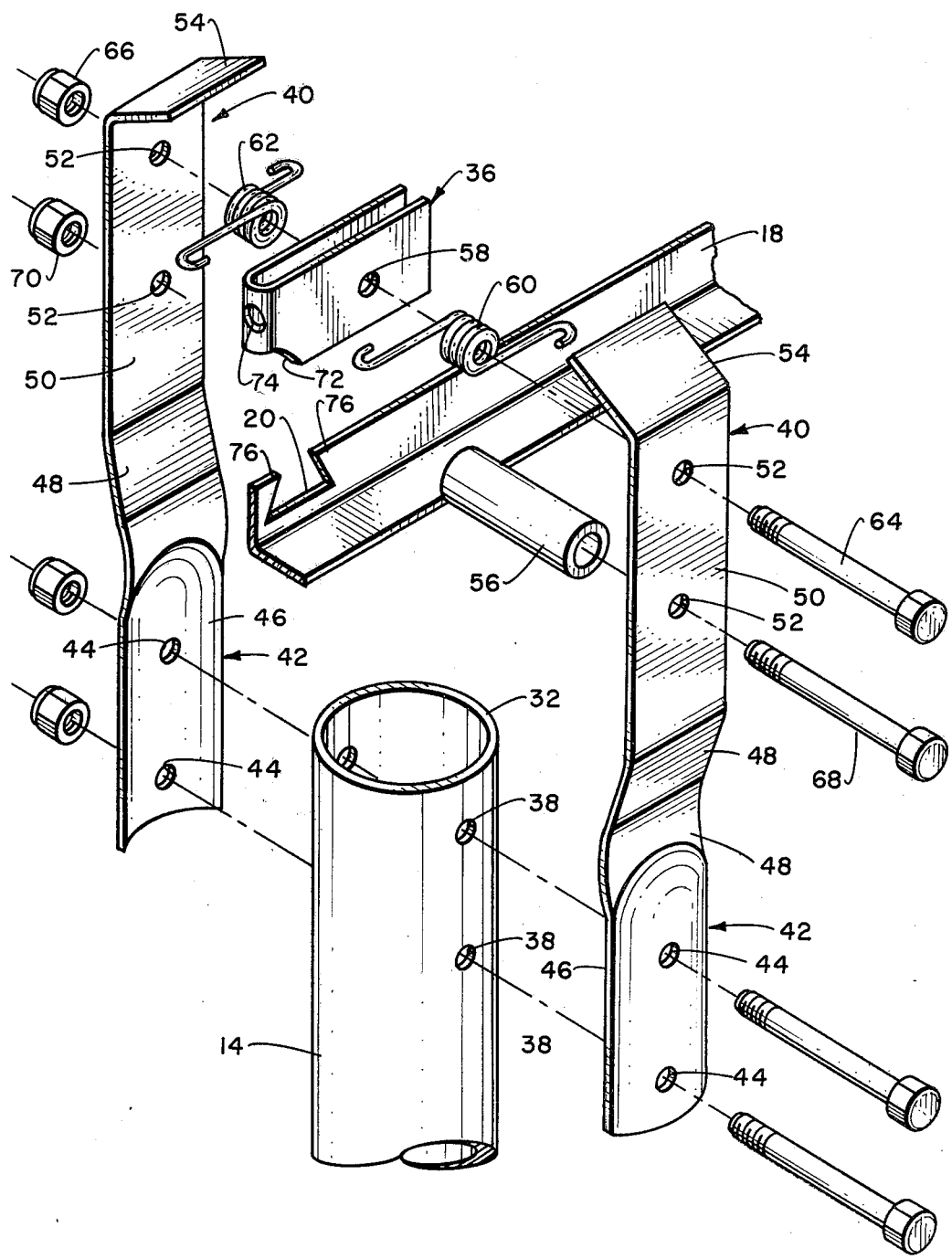
FIG. 4 is an exploded view similar to FIG. 3 showing the individual elements.

Referring to FIGS. 3 and 4, the more specific details of the invention will be seen. The terminus 32 of each of the individual swing bars 14 is provided with spaced through bores 38 in order to receive on either side upstanding ear members 40 having a lower portion 42 having spaced holes 44 in spaced alignment with through bores 38 and having contoured surface 46 so as to fit snugly to the exterior surface of terminus 32 of swing bar 14.

Integral with the lower portion 42 of ear members 40 are inner set portions 48 extending upwardly to straight run portion 50, having spaced apertures 52 and having inclined portion 54 to receive therebetween cylindrically shaped spacer sleeve 56, upon which draw bar 18 rides and is supported and having latching or locking member 36, in this particular instance of U-shaped configuration, having a through bore 58 and having torsion springs 60 and 62 on either side thereof retained in position by through bolt 64 and nut 66. Through bolt 68 is disposed through spacer sleeve 56 and retained in place by nut 70. The ends of torsion springs 60 and 62 are respectively retained by portion 50 of ear members 42 and the upper edge of locking member 36. The cut back portion or edge 72 of forward portion of lock or latch member 36, above which is located aperture 74, (which receives an edge portion of the draw bar 18 forming the slot or notch 20 which it will be noted is undercut so as to have projecting pointed portions 76 to be better received and retained by locking member 36, and more specifically, the aperture 74 provided therein) engages the linear portion of slot or notch 20 (FIG. 3).

In the assembled form as seen in FIG. 3, it should be noted that the locking member 36 is continuously urged or biased into contact and engagement with draw bar member 18 and upon movement of the draw bar 18 and positioning of the notch 20, the locking member 36 will assume the position shown in FIG. 3. In the position shown in FIG. 3, movement of the draw bar 18 will move swing bar 14 therewith and if individual movement should be desired, it is simply obtained by rotating the lock member 36 upwardly with respect to FIG. 3 to disengage the slot 20, thereby permitting pivotal movement of the swing bar 14 and it should be understood that each of the individual swing bars 14 may be so selectively and independently moved or, as indicated, once the locking member 36 of each of the swing bars 14 are in the locked or latched position with the draw bar 18, movement of the draw bar 18 as by means of the actuating mechanism 22 will move all of the swing bars so locked or latched in unison in cooperation with draw bar 18.

It should be noted that the structural configuration of the upstanding ear members 42 is such that the portions 54 overlie at least a portion of the locking mechanism, and in particular, the locking member 36. This prevents adjacently positioned cattle from intentionally or inadvertently unlocking the individual swing bar member 14 to permit an otherwise captive cow from egressing from a particular station 16. Additionally, the provision of the undercut slots 20 in cooperation with the central aperture 74 of lock member 36 prevents unintentional, inadvertent unlocking as might occur with vigorous head movements of the individual cows retained within the stations 16.

Referring now to FIG. 5, there is illustrated an alternative embodiment of the invention, wherein the components shown in FIGS. 6 and 7 are utilized, and wherein the specific elements so modified are found in FIGS. 3 and 4 previously described. For example, in the FIG. 5 embodiment, the upper portion of the upstanding ear member 100 is dispensed with and in lieu thereof, a single V-shaped member 102 provided so as to overlie the locking member 104 which, in this instance, is of identical configuration to the locking member 36, with the exception of having an extending tab portion 106 affixed or integral with the locking member 104 so as to provide a means whereby the locking or latch member 104 may be rotated upwardly from the locked to the open position for disengagement with the slot 20 of draw bar 18. This then provides a means of easily opening the individual stations 16 in moving the individual swing bar 14. In all other respects, the apparatus as depicted in FIGS. 5, 6 and 7 operates like that previously described.

Thus, there has been disclosed a multiple stanchion structure that is of the type wherein cattle may be locked in position or at a station and wherein the individual swing bars may be adequately secured to obviate inadvertent opening or unlocking. In addition, there has been disclosed a means of modifying existing stanchion structures in order to make them into self-locking types, wherein cattle, once locked in position, are retained in the captive relationship until such time as it is desired to release them. While the invention has been described with regard to specific materials and designs and configurations thereof, those of ordinary skill in the art will recognize that certain modifications and changes may be made, all without departing from the essence and spirit of the invention as defined by the appended claims.

We claim:

1. In multiple stanchion construction having vertically spaced upper and lower horizontal support members, intermediate vertical support posts and spaced swing pipes defining spaced positions for accommodating cattle in spaced, captive relationship, the improvement which comprises: a draw bar extending the length of and operatively supported relative to said upper horizontal support member from each of said spaced swing pipes; a plurality of spaced locking slots in said draw bar adjacent each of said swing pipes; a locking member pivotally supported from the upper terminii of each of said swing pipes and being normally urged into engagement with said draw bar and said spaced slots, said locking member having a rectangular configuration and being integrally formed by a central web and opposed, lateral, connected parallel legs, said web having an aperture for abutting engagement of one of said slots of said draw bar when said locking member is in the locked position, said swing pipes and cooperating locking members being selectively positionable in a locked and unlocked position; and actuator means for the horizontal movement of said draw bar to simultaneously move each of said swing bars, having its associated locking member in the engaged position with said adjacently positioned slot of said draw bar, into the locked and unlocked positions.

2. The construction in accordance with claim 1 wherein said locking members are spring biased.

3. The construction in accordance with claim 2 wherein said slots are undercut to form pointed edges.

4. The construction in accordance with claim 3 wherein said draw bar is V-shaped in cross section having integral flanges disposed at 90° to each other and said slots are formed in the vertical flange of said draw bar.

5. The construction in accordance with claim 4 wherein said swing pipes are tubular and circular in cross section.

6. The construction in accordance with claim 5 including a pair of spaced apart vertical ear members secured to the terminii of each of said swing pipes.

7. The construction in accordance with claim 6 wherein said vertical ear members have a pair of spaced securement members, one of said securement members mounting said locking member and the other mounting a spacer supporting the horizontal flange of said draw bar.

8. The construction in accordance with claim 7 wherein the lower portions of said vertical ear members are contoured to snugly fit the exterior configuration of said swing pipes.

9. The construction in accordance with claim 8 wherein said vertical ear members have an overlying upper portion extending over said locking member.

10. The construction in accordance with claim 8 wherein said overlying upper portion is formed by integral portions of each of said vertical ear members.

11. The construction in accordance with claim 10 wherein said overlying upper portion is formed by integral portions of each of said vertical ear members.

12. In cattle stanchion structure, the combination which comprises: vertically spaced upper and lower horizontal support members; vertical bracing and support members bracing and supporting said horizontal support members; spaced gate swing members and rigid vertical gate members defining therebetween a plurality of cattle receiving stations for selectively and captively retaining cattle thereat, said gate swing members having an upper free end and a lower pivotally secured end for swinging movement from vertical to off vertical; a draw bar member overlying and extending the length of and operatively supported relative to said upper horizontal support member from the upper free ends of each of said gate swing members; a plurality of spaced locking slots in said draw bar member conforming in number to and in proximity to each of said receiving stations; a locking member pivotally supported from each of said upper free ends of said gate swing members and being normally urged into engagement with said draw bar member and said plurality of spaced locking slots, each of said locking members being slideably disposed for limited travel on said draw bar member between an unlocked position and a locked slot engaging position when said gate swing members are moved from off vertical to vertical positions respectively, said locking member having a rectangular configuration and being integrally formed by a central web and opposed, lateral, connected parallel legs, said web having an aperture for abutting engagement of one of said slots of said draw bar when said locking member is in the locked position, and handle means secured through operative linkage to linearly move said draw bar member to simultaneously move each of said gate swing members, having its associated locking member engaging the associated slot in said draw bar member, to either a captive or open position.

* * * * *